United States Patent
Bearden

[11] Patent Number: 5,941,227
[45] Date of Patent: Aug. 24, 1999

[54] PORTABLE SAW WITH DISCONNECTABLE PLATFORM FOR CUTTING CONCRETE FOR CONTROLLING CRACKS

[76] Inventor: Martin A. Bearden, 300 E. Coast Highway, #212, Newport Beach, Calif. 92660

[21] Appl. No.: 07/804,090

[22] Filed: Dec. 6, 1991

[51] Int. Cl.⁶ .............. B26D 3/06; B28D 1/04; E01C 23/02; B28B 11/08

[52] U.S. Cl. .............. 125/13.01; 451/352; 30/370; 30/371; 30/391; 299/39.3; 404/93

[58] Field of Search .............. 83/875, 574, 745; 30/370, 388, 371, 375, 390, 391; 264/333; 425/457, 458, 472; 299/39.3; 404/93, 94; 125/13.01, 14, 12, 16.03; 451/352

[56] References Cited

U.S. PATENT DOCUMENTS

| | | | |
|---|---|---|---|
| 1,726,665 | 9/1929 | Heltzel | 404/89 |
| 2,581,477 | 1/1952 | Franks | 299/39.3 |
| 2,596,689 | 5/1952 | Holt | 451/352 X |
| 2,673,725 | 3/1954 | Coates | 451/352 X |
| 2,889,141 | 6/1959 | Wilson | 125/13.01 X |
| 4,078,309 | 3/1978 | Wilson | 30/375 X |
| 4,769,201 | 9/1988 | Chiuminatta et al. | 83/875 X |
| 4,891,858 | 1/1990 | Wachter | 451/352 X |
| 5,165,317 | 11/1992 | Findlay | 83/574 X |
| 5,167,215 | 12/1992 | Harding, Jr. | 125/13.01 X |

Primary Examiner—Rinaldi I. Rada
Assistant Examiner—Boyer Ashley
Attorney, Agent, or Firm—Harold D. Messner

[57] ABSTRACT

An apparatus for cutting grooves in a green concrete slab having at least one terminating side edge transverse to a broad top surface in a low cost manner is described and includes the following elements: a hand-held portable rotary saw, supported on a rollable platform disconnectably connected to and supporting the relative to the green concrete slab. The rollable platform includes a planar base in surface contact with a conventional guide plate of the saw, and flared side walls extending outwardly from the planar base an anchoring portion adapted to receive a human-generated force to provide rectilinear travel along a preselected direction over the green concrete slab. The planar base also includes a slot in alignment with an opening in the guide plate through which the saw blade extends whereby a working plane of reference is defined that intersects an axis of rotation of the saw blade whereby a maximum depth of cut is easily defined coincident with the working plane of reference. The rollable platform also includes a set of rollers in rolling contact with the green concrete slab to facilitate the rectilinear travel wherein first and second pairs of rollers define parallel axes of rotation normal to said pre-selected direction of travel that facilitate operations in a low cost manner.

17 Claims, 5 Drawing Sheets

# PORTABLE SAW WITH DISCONNECTABLE PLATFORM FOR CUTTING CONCRETE FOR CONTROLLING CRACKS

SCOPE OF THE INVENTION

The present invention relates to an apparatus and method for cutting grooves in soft or green concrete and more particularly to a hand-held worm-gear driven portable rotary saw conventional for use in construction, in disconnectable connection with a modified rollable platform. Its purpose: to cut accurate groves in a broad, top surface of the green concrete which, more likely than not, has terminating side edges transverse to the aforementioned broad surface. Such cutting operations occur before the green concrete has hardened sufficiently to allow cutting by a conventional abrasive concrete saw.

DEFINITIONS

In this applications, the following terms or term has the following meanings.

"Green" concrete is newly poured concrete, occurring after "bull floating" and finishing has been completed, but before stress due to drying has occurred and has been defined as concrete having a hardness such that a 1.125 inch diameter steel rod with a flat end and weighing about 5.75 pounds causes an indentation in the surface of the concrete of about $\frac{1}{32}$ to $\frac{5}{8}$ inch when the rod is drop from a height of about 24 inches above the surface of the concrete, whereby cutting operations therefor, occurs before the green concrete has hardened sufficiently to allow cutting by a conventional abrasive concrete saw.

"Forward end" relates to the portion of the apparatus of the invention most remote from the push force applied to the apparatus.

"Rearward end" relates to the portion of the apparatus of the invention nearest to or adjacent to the push force applied to the apparatus.

BACKGROUND OF THE INVENTION

It is known to use a saw blade attached to a platform to score or cut grooves in "soft" concrete to relieve stress as the latter dries. ("Soft" concrete is newly poured concrete, occurring after "bull floating" and finishing has been completed, but before stress due to drying has occurred.)

The dimensions of the groove: about 1 inch in depth by about $\frac{3}{16}$ inches in width. The length varies. Its purpose: to control direction and extent of cracking of the concrete. This is because the grooves in the soft concrete provided weakened planes. Such planes pass usually vertically through the grooves. Hence as the concrete cures and shrinks, the cracks are along such planes but since they begin at the trough of the groove, such cracks are not visible at the surface of the slab.

In U.S. Pat. No. 4,769,201, there is described such a concrete saw. Rollers are attached to three corners of a base plate. But because of need to add pressure about the rotating blade as the cut is made (usually, to prevent "spalding" (irregular side edges) of the cut, a pressure plate is attached to the fourth corner inline with the push pole. Since the pressure plate, and blade are cantilevered from the platform outside the rolling plane of the single inline roller (i.e., outside a horizontal plane through the roller), experience shows that a sidewise torque is imparted to the blade and pressure plate. Hence, the device in some cases as where the concrete has a large number of surface rocks, may be difficult to control. Also, a large amount of the dust is emitted as cutting occurs often obscuring the pre existing line of sight guiding the user. Dry cutting of dried, firm concrete is also difficult because of these factors. In addition, the position of the rollers plus pressure plate vis-a vis the saw blade position of maximum penetration, requires the use of a separate entry and exiting platform at the edge of the stab to begin and end the cut.

SUMMARY OF THE INVENTION

In accordance with the invention, a hand-held worm-gear driven portable rotary saw conventional for use in construction, is disconnectable connected to a modified rollable platform. Its purpose: to cut accurate groves in a broad, top surface of a green concrete slab having terminating side edges transverse to the aforementioned broad surface. In more detail, the resulting apparatus comprises:

a hand-held portable rotary saw conventional for use in construction work including a saw blade defining an axis of rotation for providing an up-cut cutting direction, a rollable platform disconnectably connected to the saw including a set of front rollers and a set of rear rollers attached to an underside of the platform in rolling contact with a top surface of a green concrete slab.

Each of the sets of rollers define a dynamically advancing rolling plane that passes through the axes of rotation of the rollers and their intersection with the top surface of the green concrete slab. In this way, human-engendered push force for advancing the co-performing platform and saw relative to the green concrete slab, can be positioned relative to the advancing rolling planes so that a minimum disruptive torque is imparted to the saw blade during operations. In addition the positioning of the saw relative to the platform can be enhanced such that the saw blade completes its maximum cut within the green concrete slab at a position that is well forward of both rolling planes. Thus such cuts can be completed without the front set of rollers encountering a transverse edge of the slab.

DETAILED DESCRIPTION OF THE DRAWINGS

DETAILED DESCRIPTION OF AN EMBODIMENT OF THE INVENTION

Figure 1:
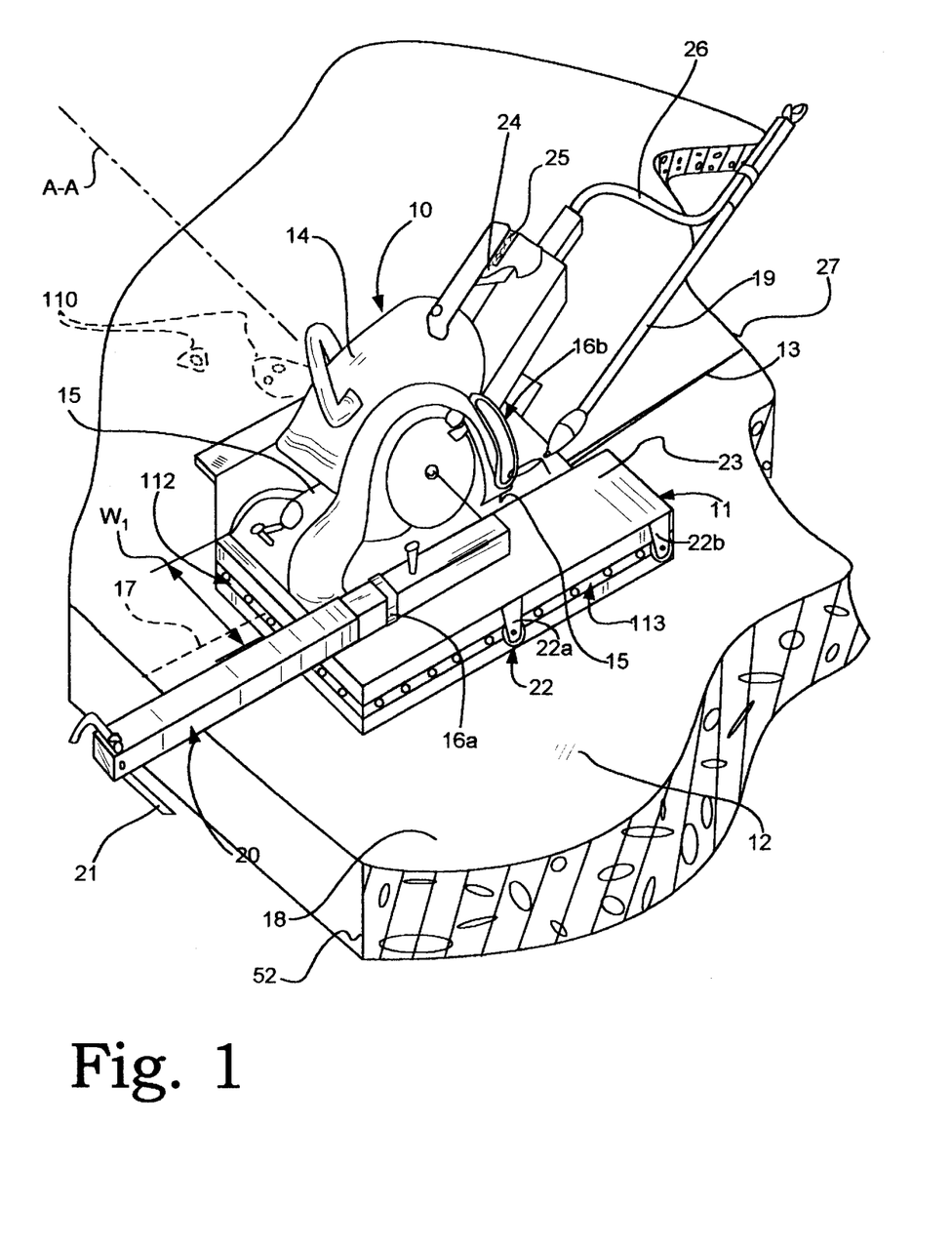
FIG. 1 is a perspective view of a rotary, portable hand-held saw in disconnectable contact with a rollable platform atop a slab of newly poured green concrete to provide a transverse cut to relieve stress in the slab.

Referring to FIG. 1, there is shown hand-held portable saw 10 in disconnectable contact with platform 11 for use atop a slab 12 of newly poured green concrete to provide a transverse cut 13 to relieve stress. The saw 10 has an axis of rotation A—A and includes a housing 14 and guide plate 15 disconnectable connected to each other by a pair of bolt-nut bracket fasteners indicated at 16a and 16b, respectively, the details of which are set forth below.

The rotating saw 10 and platform 11, in combination, are moved along sight line 17 (usually a chalked line) on top surface 18 of the green concrete 12 by an user (not shown). The later applies force to the saw 10 and floor plate 11 via push rod 19. Guide arm 20 attached to the floor plate 11 includes a marking pin 21 alignable with sight line 17. Movement over surface 18 of the stab 12 is provided by sets of rollers 22. The sets of rollers includes a forward or front pair 22a and a rearward or rear pair 22b attached to undersurface 23 of the platform 11. The saw 10 includes a ON-OFF trigger 24 held in the ON-position by a clasp 25. Energy to power the saw 10 flows from an electrical source via conductor 26 attached to the push rod 19 by a second clasp 27.

Figure 2:
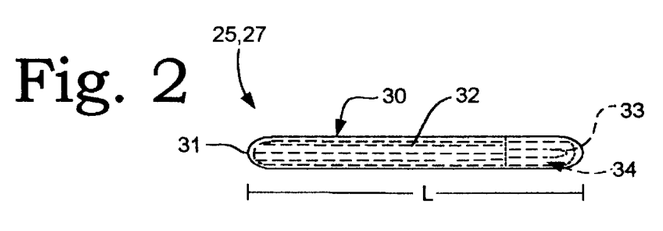
FIG. 2 is a side elevational view of a strap used in conjunction with the portable saw of FIG. 1.

FIG. 2 illustrates the clasps 25, 27 in more detail.

As shown the clasps 25, 27 are of the hook-and-pile, quick release type. Each clasps 25 or 27 includes a strap 30 formed of nylon or the like having a broad surface 31 fitted with a pile section 32 over 75% of its length L. On opposite broad surface 33 is hook section 34 over the remaining 25% of the length L.

Figure 3:
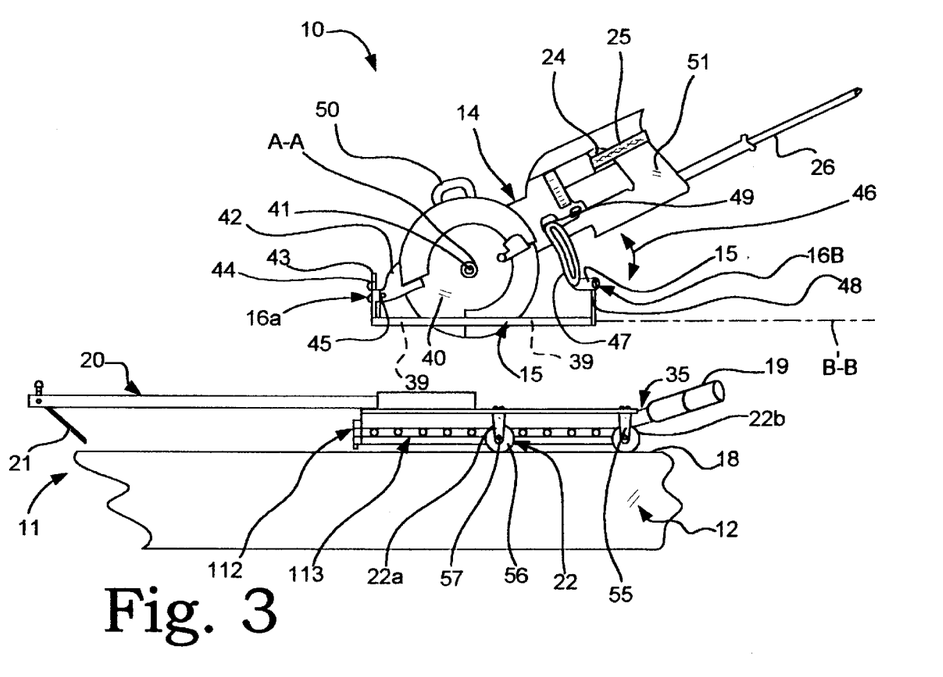
FIG. 3 is a side elevation view of the saw and platform of FIG. 1, exploded to show their positional relationship prior to attachment.
Figure 6:
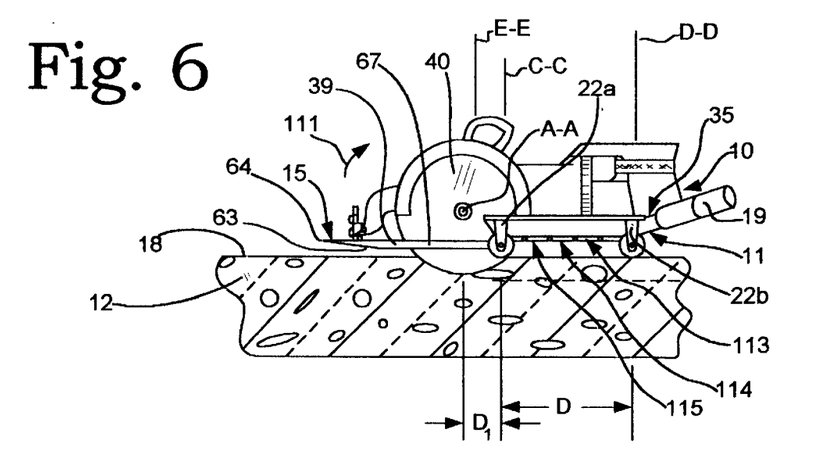
FIG. 6 is a side elevation view of the portable saw and platform of FIG. 1, in which (i) the forward portion of the platform has been broken away to clearly show the guide plate and saw blade of the saw, and (ii) the concrete has been broken away to illustrate the how the saw blade (as indicated by its maximum depth of the cut) is forward of the axis of rotation of the forward pair of rollers.

FIGS. 3 and 6 show saw 10 in more detail.

As shown, the saw 10 includes the housing 14 and guide plate 15 previously mentioned. The guide plate 15 is of rectangular cross section, has a central opening 39 of rectangular cross section as well as a width W1 (see FIG. 1). Within the housing 14 is a saw blade 40 attached by a shaft 41 to an electrical motor (not shown), the blade 40 thus having the capability of rotating about the axis of rotation wherein the teeth (not shown) of the saw blade 40 first contacts top surface 18 of the green concrete 12 at a position closest to the clasps 24, 25 and then exits from a location more remote therefrom A—A previously mentioned and penetrating through the opening 39 of the guide plate 15 to provide an up-cut direction of rotation. At forward portion 42 of the housing 14 is the pivotally mount fastener 16a previously mentioned, that permits both angular and horizontal movement of the housing 14 (and blade 40 and shaft 41) relative to the guide plate 15. Angular movement uses slotted bracket 43 and stub 44 of the fastener 16a, while horizontal pivotal movement is about shaft 45 through the forward portion 42 of the housing 14. But since the present invention contemplates the saw 10 will be used most often to cut grooves 13 that are normal to the surface 18 of the concrete 12, the axes of symmetry (vertical and horizontal) of the opening 39 will most often be normal to the axis of rotation A—A of the saw blade 40. Pivotal movement is in the directions of arrows 46. When the correct amount of pivotal movement above shaft 45 has occurred (as where a plane of reference B—B (see FIG. 3) through the guide plate 15 is a correct distance below the axis of rotation A—A), the housing 14 is locked in position via the heel bracket-stud-nut fastener 16b previously mentioned. Such rotation controls the depth of cut of the saw blade 40. The heel bracket-bolt-nut fastener 16b comprises slotted arcuate bracket 47 connected to the guide plate 15 at back plate 48. Such fastener 16b includes a rotatable quick release toggle clamp 49 that contacts to a stud (not shown) attached the housing 14 to retain the housing 14 at a correct elevation relative to the guide plate 15. Hence, since the saw 10 has separate integral means to raise and lower the blade 40 relative to the surface 18 of green concrete 12, the invention is relatively inexpensive to construct and operate, and moreover, can be easily operated in firm concrete conditions, as where a deep cut precedes pulverization of a section of concrete, as using a power-driven jack hammer. As previously mentioned, the saw 10 is held in the ON-position by clasp 25 engaging the trigger 24, while electrical conductor 26 transmit energy to operate the saw 10.

Guide handles 50, 51 attach to the housing 14 of the saw 10 in conventional manner to permit the saw 10 to be used in other conventional carpentry-like activities. In this regard, a portable, rotary hand-held saw manufactured by Skil Corporation, Model 77 which is worm gear driven, is adequate.

FIGS. 3, 4, 5 and 6 illustrate platform 11 in more detail.

As shown, the platform 11 is attached to surface 18 of the green concrete slab 12 via the set of rollers 22 that includes front rollers 22a and rear rollers 22b. Each roller of the pairs 22a, 22b is identical and includes a U-shaped bracket 55 attached to a wheel 56 of common diameter D0 through a shaft 57. The pairs of rollers 22a, 22b have spaced apart axes of rotation 57a, 57b (see FIGS. 3 & 5) and define a pair of dynamically occurring rolling reference planes relative to the surface 18 of the slab 12. The planes are indicated at C—C and D—D in the FIGS. 3 and 4 and are coextensive of the axes of rotation 57a, 57b of the wheels 56 and their intersections F1, F2 with the surface 18 of the slab 12.

The rolling plane C—C of the front pair of rollers 22a is offset a lateral distance D from the plane D—D of the rear pair of rollers 22b (see FIG. 6) but is always rearward of of transverse working plane E—E. The working plane E—E passes through axis of rotation A—A of the saw blade 40, to be normal to the top surface 18 of the slab 12 as well as being normal to previously mentioned transverse working plane of reference B—B shown in FIG. 3. That is, depth of maximum cut provided by saw blade 40 (that is also coextensive with working plane E—E) is always a minimum distance D1 forward of rolling plane C—C of the front pair of rollers 22a. Hence, this permits the rotating saw blade 40 to complete its cut (identified with working plane E—E, of course) through the surface 18 of the slab 12 without the front set rollers 22a falling off an transverse edge 52 (see FIG. 1) of the slab 12.

Figure 4:
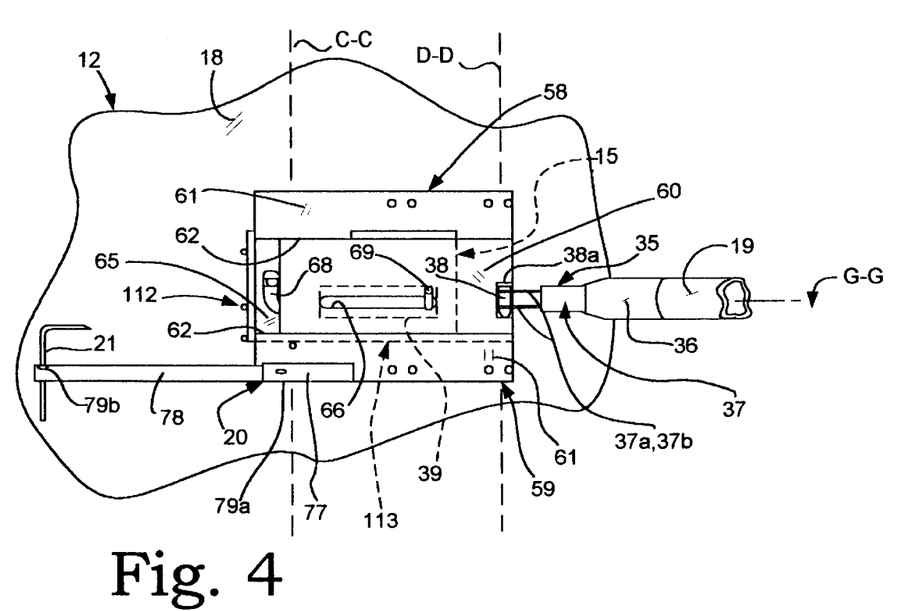
FIG. 4 is a top elevational view of the platform of FIG. 3 in which the guide plate of the saw of FIG. 1 has been superimposed in phantom line to indicate location as well as illustrate a pair of forward and rearward quick release fasteners for disconnectably connecting the saw to the platform.
Figure 5:
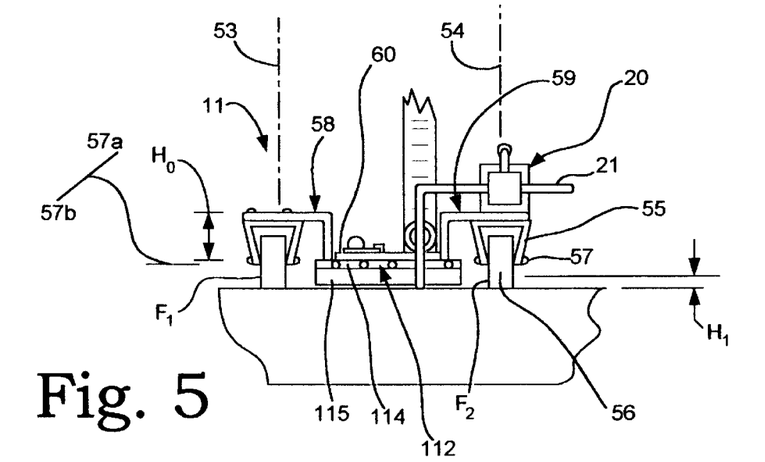
FIG. 5 is an end view of the platform of FIG. 3.

As shown best in FIG. 5, the platform 11 includes flared pairs of L-shaped side walls 58, 59. The walls 58, 59 are integrally attached to planar base 60. Note in FIG. 4 that leg 61 of each side wall 58, 59 extends parallel to top, broad surface 18 of the green concrete 12 but upright leg 62 is normal to both the surface 18 and the planar base 60. The sets of rollers 22 attach to the undersurfaces of the transverse legs 61 of the side walls 58, 59 wherein the diameters D0 of the wheels 56 and the height H0 of the upright legs 62 are interrelated so that the planar base 60 is closely adjacent to the top surface 18 of the slab 12 a height H1.

That is, the planar base 60 is horizontally positioned above the surface 18 by the height H1 that is directly related to the wheel diameter of the rollers 22 and the height of the side walls 58, 59.

The purpose of the planar base 60 and side walls 58, 59 is to form a rigid, recess to slidably but fixably accept underside 63 of the guide plate 15 (see FIG. 6) so that the saw blade 40 of the saw 10 can penetrated both rectangular opening 39 of the guide plate 15 and central slot 66 of the planar base 60. In this regard, transverse side edges 67 (see FIG. 6) of the guide plate 15 are in frictional but slidably contact with the upright legs 62 of the L-shaped side walls 58, 59 to prevent sidewise movement of the guide plate 15 relative to the base 60. Front edge 64 (also see FIG. 6) attaches under L-shaped lip 65 at the forward portion of planar base 60, see FIG. 4, to prevent forward rectilinear travel of the guide plate 15. Toward the mid-span of the planar base 60 is the slot 66 that, as previously mentioned, is axially aligned with the opening 39 of the guide plate 15. At the rear portion of the base 60, attachment of the guide plate 15 is via a fastener indicated at 69 see FIG. 4 adjacent to slot 66. In order to accommodate different thickness that may occur in guide plate 15, a forward attaching fastener 68 (see FIG. 4) can be added at the L-shaped lip 65 as shown.

Figure 7:
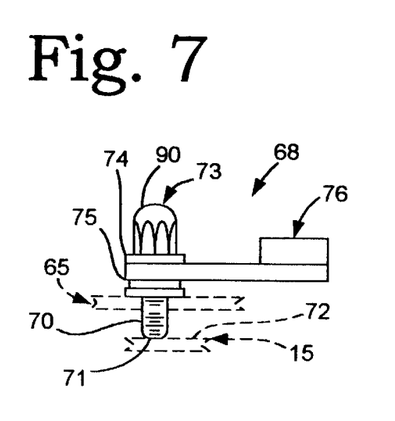
FIGS. 7 and 8 are detailed side elevational views of the pair of the forward and rearward quick release fasteners, respectively, of FIG. 4 showing the guide plate of the saw in phantom line.

FIG. 7 illustrates quick release fastener 68 in more detail.

As shown, fastener 68 comprises a left-hand threaded pin 70 threadably engaged to the lip 65. The pin 70 has an end 71 that moves downward into contact with upper surface 72 of the guide plate 15. Such movement of the pin 70 carries with the latter, the following: lock nut 73, spring-loaded clips 74 and 75 and push arm 76. Their operation will be explained in more detail below with reference to FIGS. 9–12.

Figure 8:
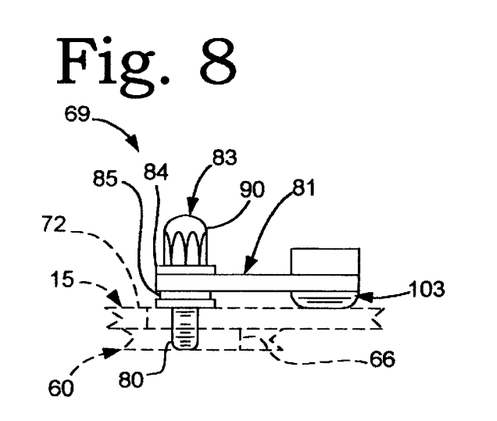

FIG. 8 shows quick release fastener 69 in more detail.

As shown, the fastener 69 attaches to threaded stud 80 permanently attached to planar base 60 adjacent to slot 66 and includes a rotatable wedge 81 that rotates about stud 80 into contact with upper surface 72 of the guide plate 15 of the saw 10. Rotation of the wedge 81 carries with the latter the following: lock nut 83 and spring-loaded clips 84 and 85. Their operation will be explained in reference to FIGS. 9–11 and 13.

Figure 9:
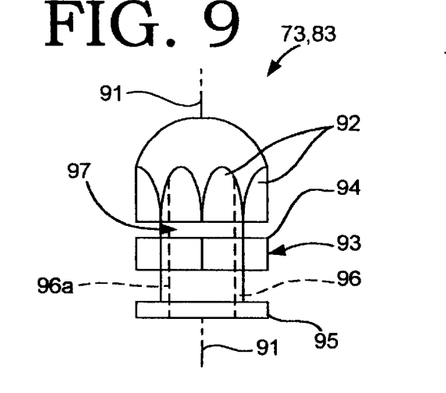
FIGS. 9 and 10 are detailed side elevational and top elevational views, respectively, of a domed lock nut used to form the pair of fasteners of FIGS. 7 and 8.
Figure 10:
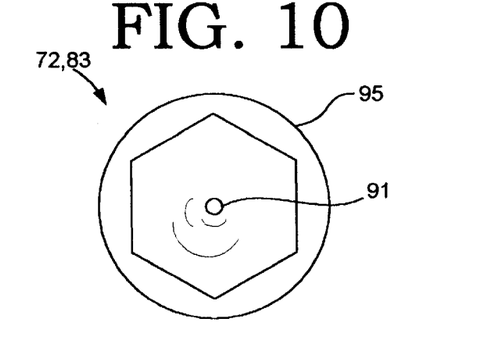
Figure 11:
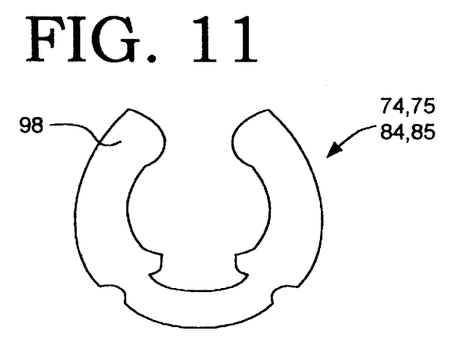
FIG. 11 is a detailed top elevational view of a spring-biasable clip used to form the pair of fasteners of FIGS. 7 and 8.

In explaining the operation of the quick release fasteners 68, 69 note that FIGS. 9 and 10 show lock nut 73, 83 in more detail.

Figure 12:
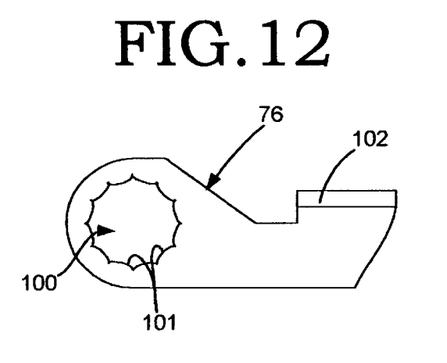
FIG. 12 is a detailed side elevational view of a pivot arm used to form the forward fastener of FIG. 7.
Figure 13:
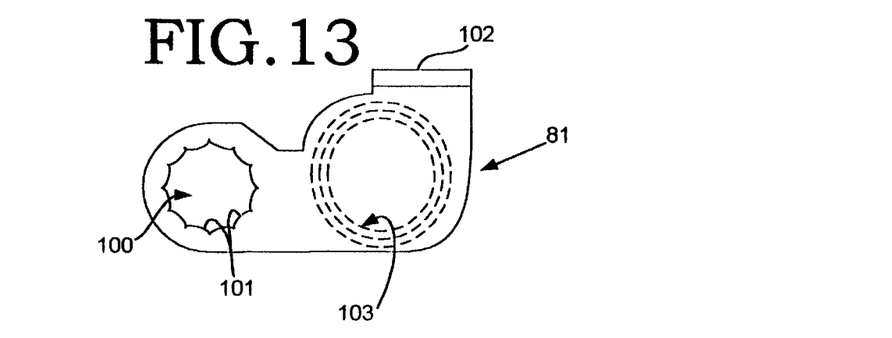
FIG. 13 is a detailed side elevational view of a wedge used to form the rearward fastener of FIG. 8.

As shown, the lock nut 73, 83 includes dome 90 having an axis of symmetry 91 and a series of flat sides 92 in which each diametrically opposed pair (relative to axis of symmetry 91) is parallel. At the terminus of the dome 90 is a cylindrical housing 93 defining a series of shoulders 94, 95 between recesses 96a, 96b exterior of threaded bore 97. The shoulder 54 has its outer periphery worked to match the shape of the flat sides 92 of the dome 90. Thus when the push arm 76 of FIG. 7 and rotatable wedge 81 of FIG. 8 is slide over the dome 90 and pass to the shoulder 94, a working position is defined wherein rotation of the former, cause corresponding movement of the dome 90 and housing 93. Clips 74, 75, 84 and 85 have spring-biasing legs 98 (see FIG. 11) that are retained within recesses 96a, 96b to anchor the push arm 76 (FIG. 7) and wedge 81 (FIG. 8) in working relationship with shoulder 94. In this regard, both the push arm 76 and the wedge 81 as shown in FIGS. 12 and 13, respectively, include a central opening 100 having its side wall 101 sectored into 12 areas to permit the former to fitted at various angles so that only a minimum of a one/half turn or less will affect closure to the element to be retained. Up-right fin 102 at the end the arm 76 and rotatable wedge 81 permits an user's thumb to force rotation to force closure. In this regard, note that the type of closure caused by rotation of the arm 76 differs from that of wedge 81. In FIG. 7, closure is via movement of pin end 71 into contact with the upper surface 72 of the guide plate 15. While in FIG. 8, the wedge 81 itself include a truncated ellipsoid 103 at underside surface 104 which rotate into bearing contact with surface 72 of the guide plate 15.

METHOD ASPECTS OF THE INVENTION

In operation, as shown in FIGS. 1, 3 and 6 the saw 10 is disconnectable connected to the floor plate 11, and the saw 10 and floor plate 11, in combination, are moved along the sight line 17 placed on the surface 18 of the green concrete 12. These is achieved by stretching a chalked line across the concrete in the correct direction to relieve stress and then snapping the taunt chalked line to create the sight line 17. Movement over surface 18 of the stab 12 is aided the fact that the pairs of rollers 22a, 22b interface between the surface 18 of green concrete 12 and the moving saw 10 and plate 11 combination. Source of such movement is via an user (not shown) who applies force to the saw 10 and floor plate 11 via push rod 19.

In this regard, the planar base 60 of the platform 11 (see FIG. 4) also has a rear portion provided with a push pole adapter 35 attached to one end of the push rod 19. The adapter 35 includes a cylindrical housing 36 which accepts the end of the aluminum or fiberglass push rod 19 and terminates in a bifurcated bracket 37. The bracket 37 includes pair of parallel fingers 37a, 37b defining an opening (not shown) therebetween through which an anchoring ear 38 extends. The anchoring ear 38 includes a base 38a attached to the planar base 60. The ear 38 and the fingers 37a, 37b are provided with alignable openings (not shown) through which an attaching bolt extend, the latter being capped by a conventional attachment nut.

In the transverse direction, the ear 38 is preferably aligned with the slot 66 of the planar base 60 and with a third working plane of reference G—G which bisects the slot 66 and is coextensive of the saw blade 40 of the saw 10. In that way, the pushing force applied to the platform 11 via rod 19 is also coextensive of the working plane G—G so minimum disruptive force is applied to saw blade 40 during operations.

That is, all component push forces are coextensive of plane G—G which, in turn, is coincident with the saw blade 40. Note also that while ear 38 is slightly outside the rear rolling plane D—D associated with the rear set of rollers 22b, the ear 38 is well within lateral (side) planes 53, 54 formed from one each of front and rear rollers 22a, 22b. Such planes 53, 54 pass through the L-shaped side walls 58, 59 and are normal to the top surface 18 of the slab 12. Furthermore, since the center of the ear 38 is outside the rolling plane D—D, a moment of force is generated that is exterior of the rear rolling plane D—D so as to provide a downwardly acting loading of the rear set of rear rollers 22b wherein slippage relative to the top surface 18 of the green concrete slab 12 is minimized. Hence, a stable platform 11 is provided with minimum disruptive characteristics.

During movement, the user is also aided by the function of guide arm 20 including marking pin 21. As shown in FIG.

4, guide arm 20 includes mount 77 attached to the L-shaped shoulder 59 of the planar base 60. Slidably secured within mount 77 is slidable guideway 78 that cantilevers from the mount 77. At the end of the guideway 78 is the marking pin 21 alignable with the sight line 17. A pair of threading pins 79a, 79b afix the guideway 78 relative to the mount 77 and the marking pin 21 relative to the guideway 78, respectively.

During operation, dust clouds 110 (see FIG. 1) comprising particles of concrete are usually created. Note such clouds 110 result, in part, from the fact that the saw 10 is rotating in the up-cut motion such that the rotation of the blade 40 (see FIG. 6) is out of the plane of the concrete 12 in the direction of arrow 111. While such motion does keep the groove 13 somewhat clear of concrete particles, it also can obscure the sight line 17.

In order that such clouds 110 do not obscure the sight line 17, the present invention provides a pair of dust skirts 112, 113 along the front edge and a side edge of the floor plate 11, see FIGS. 1, 3–6. The dust skirts 112, 113 each comprising a U shaped bracket 114 (see FIG. 6) that capture skirt 115 of rectangular cross section so the terminating edge is slightly above the surface 18 of the concrete slab 12.

In summary, the method of the invention encompasses steps that perform the above. That is, there is disclosed a method of cutting a groove 13 in broad top surface 18 of the green concrete slab 12 that also includes terminating side edge 52 (see FIG. 1) transverse to the broad surface 18, using hand-held portable rotary saw 10 conventional for use in construction work in disconnectably connection with wing-shaped floor plate 11 rollerably attached to the top surface 18, comprising the steps of:

(a) smoothing and compacting a top broad surface 18 of the green concrete 12 which has at least one terminating side edge 52 transverse to the broad surface 18, (b) providing a sight line 17 along the top surface 18, (c) cutting a groove 13 in the top surface 18 along the sight line 17 using upcut rotation of saw blade 40 of a conventional rotary, portable saw 10 of conventional design, disconnectably attached to the platform 11 rollably supported on the top surface 18 by a set of rollers 22, the cutting occurring before the green concrete 12 has hardened sufficiently to allow cutting by a conventional abrasive concrete saw.

The above description contains several specific embodiments of the invention. It is not intended that such be construed as limitations on the scope of the invention, but merely as examples of preferred embodiments. Persons skilled in the art can envision other obvious possible variations within the scope of the description. For example, the rollers pairs 22a and 22b could be increased in width if desired to increase transverse friction to hold a given line of movement. Still further, the electrical conductor 26 that transmits electrical energy to power the saw 10, can be provided with separate ON-OFF switches positioned adjacent to the end of the push rod 19. In addition, a pressure plate could be attached to the underside of the platform 11 about the opening 39 of the guide plate 15 and slot 66 in the planar base 60. Its purpose: to pack down the green concrete 12 to prevent damage ("spalding") in the region about the cut under some cutting operations. The pressure plate would be wing-shaped and have a narrow opening through which the saw blade 40 extends. Hence, the scope of the invention is to be determined by the appended claims and their legal equivalents.

What is claimed is:

1. Apparatus for cutting grooves in a green concrete slab having at least one terminating side edge transverse to a broad top surface, comprising a hand-held portable rotary saw having a housing, a guide plate defining (i) end and side edges and (ii) a broad undersurface and opening therethrough, a saw blade being attached to said housing and rotatable relative thereto about an axis of rotation in an up-cut direction, said saw blade including an outer curved sector extending through said opening of said guide plate, means for releasably attaching said guide plate relative to said housing to permit incremental rotation of said saw blade relative to a first working plane of reference horizontally parallel to said guide plate, a rollable platform disconnectably connected to and supporting said saw relative to a green concrete slab, said rollable platform including a planar base in surface contact with said guide plate of said saw, and flared side walls extending outwardly from said planar base, said planar base having an anchoring portion adapted to receive a human-generated force to provide said platform and said saw with rectilinear travel along a preselected direction over said green concrete slab having a top surface, said planar base also including a slot in alignment with said opening of said guide plate through which said sector of said saw blade extends, said saw blade defining a second working plane of reference that intersects said axis of rotation of said saw blade and intersects said top surface of said green concrete slab and intersects said first working plane of reference whereby a maximum depth of cut generated by said saw blade relative to said top surface of said slab during operations, is defined coincident with said second working plane of reference and is measured relative to said first working plane of reference, a set of rollers attached to said rollable platform in rolling contact with said green concrete slab to facilitate said rectilinear travel of said platform in said pre-selected direction, said set of rollers including first and second pairs of rollers defining parallel axes of rotation normal to said pre-selected direction of travel, said first and second pairs of rollers also defining first and second transverse dynamically occurring railing planes, each of which being coincident with said respective axes of rotation and normal to said top surface of said concrete slab, said rolling planes being positioned such that (i) said anchoring portion of said planar base adapted to receive said human-generated force, stabilizes said platform and said saw during rectilinear travel across said green concrete slab, and (ii) said second working plane of reference is offset from both said first and second transverse rolling planes in the direction of said pre-selected direction of travel (1) whereby minimum disruptive forces are imparted to said saw blade during said rectilinear travel and (2) wherein said blade comprises its maximum cut well prior to said first pair of rollers exiting from said green concrete slab.

2. The apparatus of claim 1 in which said flared side walls of said rollable platform are inverted L-shaped in cross section having longitudinally extending legs normal to said planar base extending from side edges thereof, said longitudinally extending legs being in contact with said side edges of said guide plate of said saw thereby preventing sidewise movement thereof relative to said rollable housing during operations.

3. The apparatus of claim 2 in which said inverted L-shaped side walls includes transverse legs normal to said longitudinally extending legs and each including a coplanar undersurface parallel with said planar base but spaced vertically from said first working plane of reference by a pre-selected height (H1).

4. The apparatus of claim 3 in which said rollers are each of common wheel diameter (D1) and are attached to said coplanar undersurfaces of said L-shaped side walls of said rollable platform in rolling contact with said green concrete slab, said common wheel diameter (D1) of said rollers defining a selected height (H) related to said undersurface of said transverse legs above said planar base as well as the position of planar base above but closely adjacent to said top surface of said green concrete slab wherein said saw blade extending through said slot in said planar base, is positioned relative to said to surface of said green concrete slab to execute a desired cutting depth therein.

5. The apparatus of claim 4 including a third working plane of reference normal to said first and second working planes of reference, said third working plane of reference bisecting said slot and said anchoring portion of said planar base wherein human-generated force for engendering travel is coextensive thereof whereby minimum sidewise torque is imparted to said saw blade during operations.

6. The apparatus of claim 5 in which said anchoring portion of said planar base comprises a pole adaptor attached to said planar base having bifurcated fingers, a cylindrical housing having an end attached to said fingers, and a push pole having one end attached within said housing and another end adapted to be gripped by a human, said pole adaptor being bisected by said third working plane of reference.

7. The apparatus of claim 1 in which said slot of said planar base includes an L-shaped lip near a front edge of said slot and first and second quick attaching fasteners for releasably attaching said guide plate of said saw relative to said planar base.

8. The apparatus of claim 7 in which said first and second quick attaching fasteners each includes a threaded stud mounted to said planar base, a cap nut including a shaft having a series of shoulders therealong, a push arm, and a series of spring-biased clips to attach said push arm to said cap nut whereby rotation of said cap nut carries said push arm and said series of clips therealong to provide quick-release function thereto.

9. The apparatus of claim 1 including a plurality of skirts attached to said rollable platform to substantially prevent emission of concrete dust offset laterally and longitudinally with respect to said saw blade extending through said slot.

10. The apparatus of claim 9 in which said plurality of skirts includes a first skirt attached to said planar base at a location offset longitudinally with respect to said saw blade, said skirt positioned transverse to the direction of travel of said saw and said rollable platform and a second skirt attached to one of said flared side walls closely adjacent to said saw blade and parallel to said direction of travel.

11. The apparatus of claim 10 in which said first and second skirts are each of a rubber material attached to said rollable platform by an elongated bracket that is U-shaped in cross section.

12. The apparatus of claim 1 including a sight arm attached and cantilevered from of said rollable platform to aid in guiding said saw and platform over said broad top surface of said green concrete slab.

13. The apparatus of claim 1 in which said saw is a portable rotary, worm-gear driven saw.

14. In cutting grooves, the combination comprising a green concrete slab having at least one terminating side edge and a top broad surface transverse to said at least one terminating side edge, a hand-held portable rotary saw having a housing, a guide plate, a saw blade extending through said guide plate and being in attachment with and rotatable relative to said housing about an axis of rotation in an up-cut direction, said guide plate defining end and side edges, a broad undersurface and opening therethrough, a first working plane of reference horizontally coincident with said guide plate, said saw blade including an outer curved sector extending through said opening of said guide plate, means for releasably attaching said guide plate relative to said housing to permit incremental rotation of said saw blade within and through said first working plane of reference, a rollable platform disconnectably connected to said saw, and including a planar base in surface contact with said guide plate of said saw, and flared side walls extending outwardly from said planar base, said planar base having an anchoring portion adapted to receive a human-generated force in a manner that provides said platform and said saw with stability during rectilinear travel along a preselected direction over said top surface of said green concrete slab, said planar base also including a slot in alignment with said opening of said guide plate through which said sector of said saw blade extends whereby a second working plane of reference is defined that intersects said axis of rotation of said saw blade and is normal to said top surface of said green concrete slab and to said first working plane of reference whereby a maximum depth of cut generated by said saw blade relative to said top surface of said slab during operations, is defined coincident with said second working plane of reference measured from said first working plane of reference, a set of rollers attached to said rollable platform to facilitate said rectilinear travel of said rollable platform in said pre-selected direction, said set of rollers including first and second pairs of rollers defining parallel axes of rotation normal to said pre-selected direction of travel, said first and second pairs of rollers also defining first and second transverse dynamically occurring rolling planes, each of which being coincident with said respective axes of rotation and normal to said top surface of said concrete slab, said rolling planes being positioned such that (i) said anchoring portion of said planar base adapted to receive said human-generated force, stabilizes said platform and said saw during rectilinear travel across said green concrete slab, and (ii) said second working plane of reference is offset from both said first and second transverse rolling planes in the direction of said pre-selected direction of travel (1) whereby minimum disruptive forces are imparted to said saw blade during said rectilinear travel and (2) wherein saw blade completes its maximum cut well prior to said first pair of rollers encountering said at least one terminating side edge of said green concrete slab.

15. The combination of claim 14 in which said anchoring portion includes a push pole adapter and a push rod having one end attached to said pole adapter in alignment with said second working plane of reference whereby pushing force applied to said push pole adapter is coextensive of said saw blade and interior of said vertical rolling planes to provide minimum sidewise disruptive torque to said saw blade.

16. The combination of claim 14 in which said planar base includes an inverted L-shaped lip near a forward portion of said planar base and first and second quick-release fasteners for releasably attaching said guide plate relative to said planar base.

17. The combination of claim 14 including first and second skirts attached to said rollable platform to substantially prevent emission of concrete dust in directions offset both laterally and longitudinally with respect to said saw blade.

* * * * *